United States Patent
Fu

(10) Patent No.: US 11,735,946 B2
(45) Date of Patent: Aug. 22, 2023

(54) VOLTAGE STABILIZING SYSTEM OF SWITCHING DIRECT CURRENT POWER SUPPLY EQUIPMENT

(71) Applicant: C-TECH UNITED CORPORATION, New Taipei (TW)

(72) Inventor: Feng-Wen Fu, New Taipei (TW)

(73) Assignee: C-TECH UNITED CORPORATION, New Taipei (TW)

( * ) Notice: Subject to any disclaimer, the term of this patent is extended or adjusted under 35 U.S.C. 154(b) by 352 days.

(21) Appl. No.: 17/230,013

(22) Filed: Apr. 14, 2021

(65) Prior Publication Data

US 2022/0337163 A1 Oct. 20, 2022

(51) Int. Cl.
*H02J 7/04* (2006.01)
*H02J 7/14* (2006.01)
*H02J 7/02* (2016.01)
*H02J 7/00* (2006.01)

(52) U.S. Cl.
CPC .............. *H02J 7/02* (2013.01); *H02J 7/0063* (2013.01)

(58) Field of Classification Search
USPC .................................. 320/101, 140, 142, 166
See application file for complete search history.

(56) References Cited

U.S. PATENT DOCUMENTS

| | | | |
|---|---|---|---|
| 10,992,238 B2 * | 4/2021 | Yoscovich | H02J 3/38 |
| 2012/0306447 A1 * | 12/2012 | Jeong | H02J 7/0016 |
| | | | 320/167 |
| 2013/0314022 A1 * | 11/2013 | Ishibashi | H02J 3/466 |
| | | | 320/101 |
| 2017/0237274 A1 * | 8/2017 | Lazarev | H02J 3/28 |
| | | | 320/166 |
| 2021/0316637 A1 * | 10/2021 | Slepchenkov | B60L 58/26 |

FOREIGN PATENT DOCUMENTS

KR 101474559 B1 * 12/2014

* cited by examiner

*Primary Examiner* — Brian Ngo
(74) *Attorney, Agent, or Firm* — Li & Cai Intellectual Property (USA) Office

(57) ABSTRACT

A voltage stabilizing system of a switching direct current (DC) power supply equipment is provided. DC power outputted by battery modules and a rectifier is boosted, bucked, or boosted and bucked by a voltage stabilizer circuit, and is then distributed to a plurality of external electronic devices or the battery modules. The voltage stabilizer circuit includes a main voltage stabilizer circuit and one or more slave voltage stabilizer circuits. The main voltage stabilizer circuit controls the slave voltage stabilizer circuits, and distributes the DC power respectively to the main voltage stabilizer circuit and the slave voltage stabilizer circuits. Circuit boards of the main voltage stabilizer circuit and the slave voltage stabilizer circuits are pluggably installed in a machine cabinet of the switching direct current power supply equipment.

8 Claims, 6 Drawing Sheets

VOLTAGE STABILIZING SYSTEM OF SWITCHING DIRECT CURRENT POWER SUPPLY EQUIPMENT

FIELD OF THE DISCLOSURE

The present disclosure relates to a power supply equipment, and more particularly to a voltage stabilizing system of a switching direct current power supply equipment.

BACKGROUND OF THE DISCLOSURE

Batteries are widely used in power supply systems, such as switching mode rectifiers (SMRs) and uninterruptible power systems (UPSs), in a communication equipment room. Voltages or currents supplied by the batteries of a battery pack will increase or decrease over time, which directly affects an energy stability of the SMR system or the UPS system. Therefore, voltage stabilizers need to be connected to output terminals of the batteries, so as to provide stable voltages.

Voltage stabilizer circuits are designed to meet different power requirements of the power supply systems. An output terminal of the power supply system outputs different derated currents. Therefore, different sizes of circuit boards of the voltage stabilizers need to be disposed in the power supply systems, which results in decreased space utilization.

For example, if a maximum voltage that the power supply system can supply is 48V, but a DC voltage of 52V is required for an external electronic device to operate, an additional power supply system cabinet that is capable of supplying a voltage of 52V must be purchased, which is inconvenient in use and incurs additional costs.

If a maximum voltage that the purchased power supply system can supply is 52V, and the battery has a full charge voltage of 54V and a cut-off voltage of 39V, the battery cannot be fully charged by a current supplied by a rectifier in the purchased power supply system. Therefore, an external power supply device must be connected to the battery and be used to supply power to the battery together with the power supply system to fully charge the battery.

SUMMARY OF THE DISCLOSURE

In response to the above-referenced technical inadequacies, the present disclosure provides a voltage stabilizing system of a switching direct current (DC) power supply equipment. The switching direct current power supply equipment includes an alternating current (AC) power distributor, a rectifier, a direct current power distributor and a battery module. The rectifier converts AC power distributed by the AC power distributor into DC power. When the rectifier does not supply power or supplies insufficient power, the battery module is discharged and outputs the DC power. The voltage stabilizing system includes a voltage stabilizer circuit. The voltage stabilizer circuit is connected to the rectifier. The voltage stabilizer circuit is configured to perform a voltage stabilization process on the DC power from the battery module and the rectifier to boost, buck, or boost and buck the DC power. The voltage stabilizer circuit is configured to distribute the DC power to a plurality of external electronic devices and the battery module to fully charge the external electronic devices and the battery module during a bidirectional operation of charging and discharging. The voltage stabilizer circuit includes a main voltage stabilizer circuit and one or more slave voltage stabilizer circuits. The main voltage stabilizer circuit is connected to the one or more slave voltage stabilizer circuits. The main voltage stabilizer circuit is configured to control the one or more slave voltage stabilizer circuits. The main voltage stabilizer circuit is configured to distribute the DC power respectively to the main voltage stabilizer circuit and the slave voltage stabilizer circuits before the main voltage stabilizer circuit and the slave voltage stabilizer circuits perform the voltage stabilization process on the DC power. A circuit board of each of the main voltage stabilizer circuit and the slave voltage stabilizer circuits is pluggably installed in a machine cabinet of the switching direct current power supply equipment.

In certain embodiments, each of the main voltage stabilizer circuit and the slave voltage stabilizer circuits includes a boost converter circuit, a buck converter circuit, a buck-boost converter circuit or any combination thereof.

In certain embodiments, after the DC power is distributed, the main voltage stabilizer circuit and the slave voltage stabilizer circuits perform the voltage stabilization process on the DC power to output a same amount of DC power.

In certain embodiments, a sum of currents that are received by the external electronic devices or the battery module is equal to a sum of currents that are provided by the main voltage stabilizer circuit and the slave voltage stabilizer circuits.

In certain embodiments, the battery module includes one or more batteries or a battery pack having the batteries.

In certain embodiments, in a normal power supplying mode, the voltage stabilizer circuit performs the voltage stabilization process on the DC power that is converted by the rectifier, and then distributes the DC power to the external electronic devices through the DC power distributor. In a battery assisting supply mode, the voltage stabilizer circuit performs the voltage stabilization process on the DC power outputted by the battery module being discharged, and then the DC power is distributed to the external electronic devices by the DC power distributor. In a battery charging mode, the voltage stabilizer circuit performs the voltage stabilization process on the DC power that is converted by the rectifier, and then provides the DC power to the battery module such that the battery module is charged by the DC power.

In certain embodiments, each of the main voltage stabilizer circuit and the slave voltage stabilizer circuits includes an input capacitor, a plurality of first enhancement mode field effect transistors (FET), an inductor, a plurality of second enhancement mode field effect transistors and an output capacitor. The input capacitor is connected between the rectifier and the first enhancement mode field effect transistors. The inductor is connected between the first enhancement mode field effect transistors and the second enhancement mode field effect transistors. The output capacitor is connected between the second enhancement mode field effect transistors and the battery module. The main voltage stabilizer circuit further includes a driver circuit that is connected to the first enhancement mode field effect transistors and configured to drive the first enhancement mode field effect transistors.

In certain embodiments, each or any one of the main voltage stabilizer circuit and the slave voltage stabilizer circuits further includes a battery module managing unit connected to the battery module and the driver circuit. The battery module managing unit is configured to monitor the battery module and provide a state of the battery module to the driver circuit.

As described above, the present disclosure provides the voltage stabilizing system of the switching direct current power supply equipment, which has the following advantages:

1. the battery module does not need to be replaced, but the circuit boards of the voltage stabilizer circuits may be increased or decreased in quantity, such that the switching direct current power supply equipment can provide different output voltage and current to meet different power requirements;
2. the rectifier in the switching direct current power supply equipment can supply the current to charge the battery module, such that the voltage of the battery may reach any target voltage without the battery module being taken out of the machine cabinet and charged by the external power supply device; and
3. the switching direct current power supply equipment has a bidirectional full-duplexing circuit that is used to boost, buck, or boost and buck the DC power from the battery modules and charged by the rectifier.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
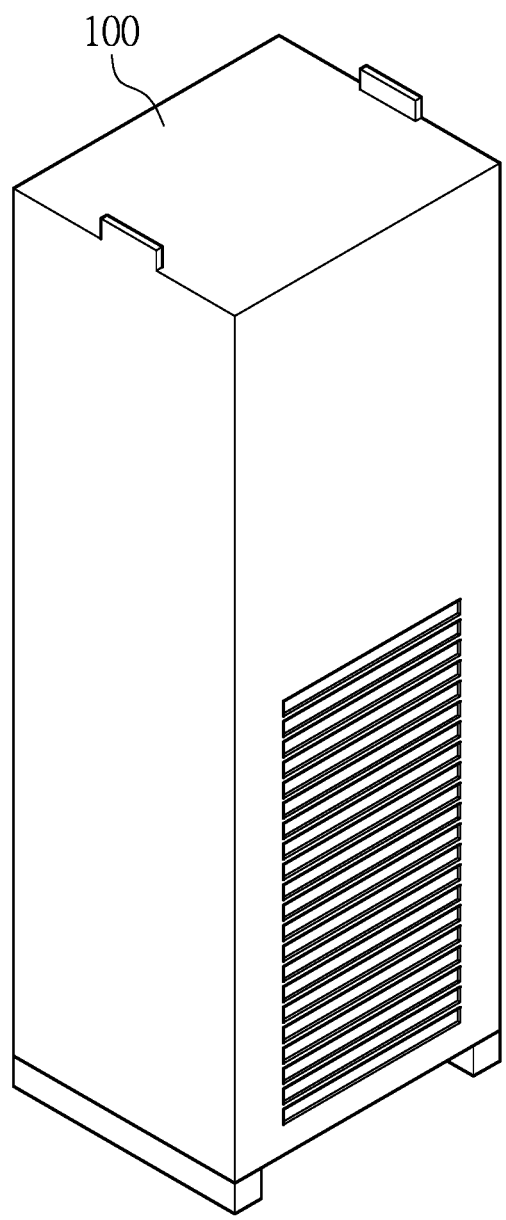
FIG. 1 is a schematic diagram of an appearance of a machine cabinet of a switching direct current power supply equipment according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
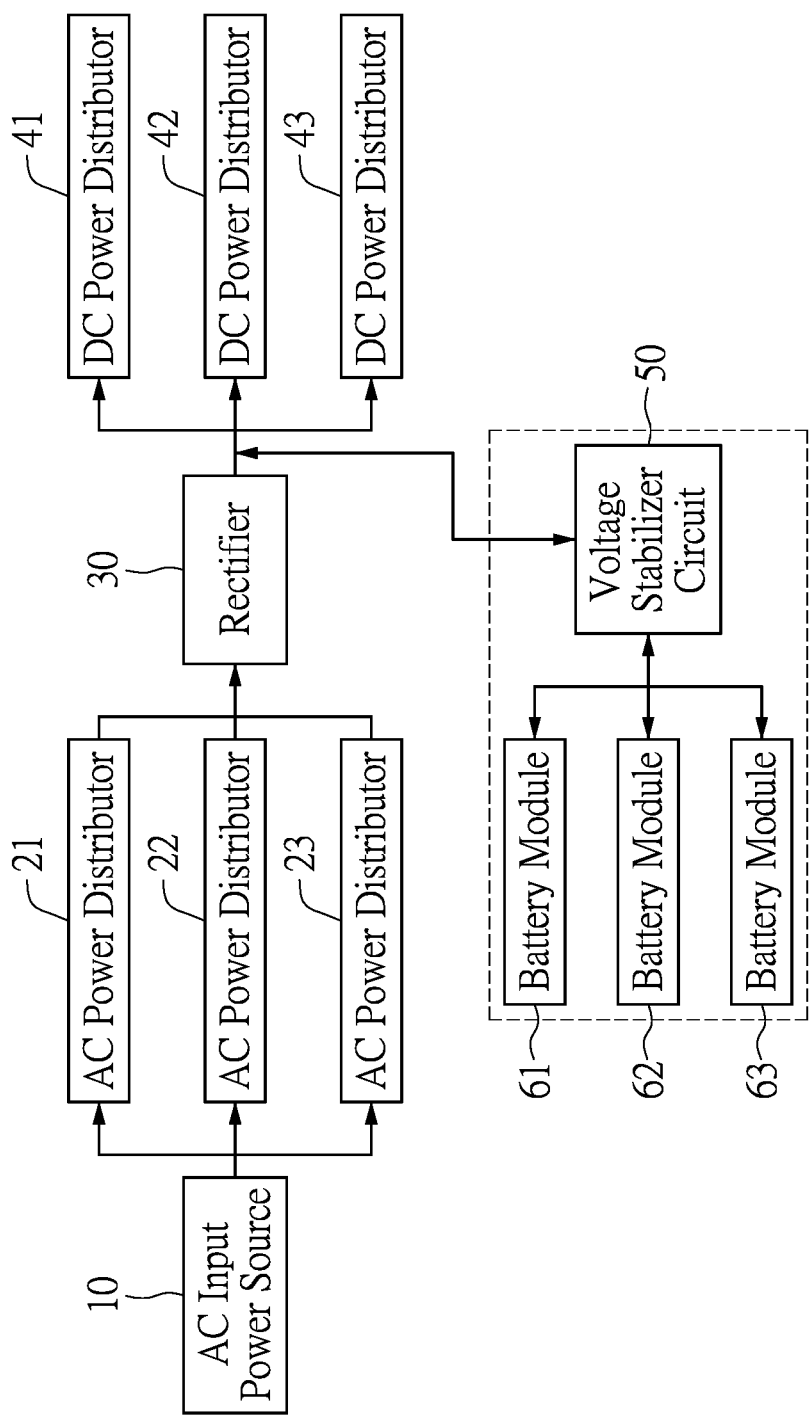
FIG. 2 is a block diagram of the switching direct current power supply equipment according to the embodiment of the present disclosure.

Reference is made to FIGS. 1 and 2, in which FIG. 1 is a schematic diagram of an appearance of a machine cabinet of a switching direct current power supply equipment according to an embodiment of the present disclosure, and FIG. 2 is a block diagram of the switching direct current power supply equipment according to the embodiment of the present disclosure.

In the embodiment, the switching direct current power supply equipment may include a plurality of circuit components, such as a voltage stabilizer circuit 50, a plurality of battery modules 61 to 63, a plurality of alternating current (AC) power distributors 21 to 23, a rectifier 30 and a plurality of direct current (DC) power distributors 41 to 43 as shown in FIG. 2. The circuit components may be installed in a machine cabinet 100 of the switching direct current power supply equipment as shown in FIG. 1. A quantity of the circuit components may be adjusted according to actual requirements, and the present disclosure is not limited thereto.

As shown in FIG. 2, the AC power distributors 21 to 23 receive AC power from an AC input power source 10 and then distribute the AC power to the rectifier 30. The rectifier 30 is connected to the AC power distributors 21 to 23. The rectifier 30 converts the AC power distributed by the AC power distributors 21 to 23 into DC power. The DC power distributors 41 to 43 are connected to the rectifier 30. In a normal power supplying mode, the DC power is distributed to external electronic devices by the DC power distributors 41 to 43.

In the embodiment, the voltage stabilizer circuit 50 is disposed in the switching direct current power supply equipment, and configured to adjust the DC power to a desired value and maintain the adjusted power at the desired value. The voltage stabilizer circuit 50 is connected between the rectifier 30 and the battery modules 61 to 63.

It is worth noting that, in the embodiment, the switching direct current power supply equipment has a bidirectional full-duplexing circuit that is used to boost, buck, or boost and buck the DC power from the battery modules 61 to 63 and the rectifier 30, and then output the DC power to the battery modules 61 to 63, which is specifically described in the following.

The voltage stabilizer circuit 50 in the machine cabinet 100 of the switching direct current power supply equipment may include a boost converter circuit, a buck converter circuit and a buck-boost converter circuit. The voltage stabilizer circuit 50 may perform a voltage stabilization process on the DC power from the battery modules 61 to 63 and the rectifier 30 to boost, buck, or boost and buck the DC power. Then, the DC power distributors 41 to 43 may distribute the boosted or bucked DC power to the external electronic devices, such that the external electronic devices are charged by the DC power. Alternatively, the voltage stabilizer circuit 50 may provide the boosted or bucked DC power to the battery modules 61 to 63, such that the battery modules 61 to 63 are charged by the DC power. Therefore, a bidirectional operation of boosting and bucking or charging and discharging may be realized in the switching direct current power supply equipment of the embodiment. In particular, the voltage stabilizer circuit 50 may boost the DC power from the rectifier 30 and charge the battery modules 61 to 63 by the boosted DC power, such that the battery modules 61 to 63 reach full charge.

For example, if the AC input power source 10 is capable of supplying the AC power required for the external electronic devices, a normal power supplying mode is entered into. In the normal power supplying mode, the voltage stabilizer circuit 50 performs the voltage stabilization process on the DC power that was converted by the rectifier 30, and then the DC power distributors 41 to 43 distribute the boosted or bucked DC power from the voltage stabilizer circuit 50 to the external electronic devices.

Conversely, if the AC input power source 10 is incapable of supplying the AC power required for the external electronic devices, a battery assisting supply mode is entered into. In the battery assisting supply mode, the battery modules 61 to 63 are discharged and output the DC power. Then, the voltage stabilizer circuit 50 performs the voltage stabilization process on the DC power from the battery modules 61 to 63. Finally, the DC power distributors 41 to 43 distribute the boosted or bucked DC power from the voltage stabilizer circuit 50 to the external electronic devices.

If the AC input power source 10 is capable of supplying the AC power, but the AC power is not required for the external electronic devices, a battery charging mode may be entered. In the battery charging mode, the voltage stabilizer circuit 50 performs the voltage stabilization process on the DC power that was converted by the rectifier 30, and then provides the boosted or bucked DC power to the battery modules 61 to 63 to charge the battery modules 61 to 63.

Figure 3:
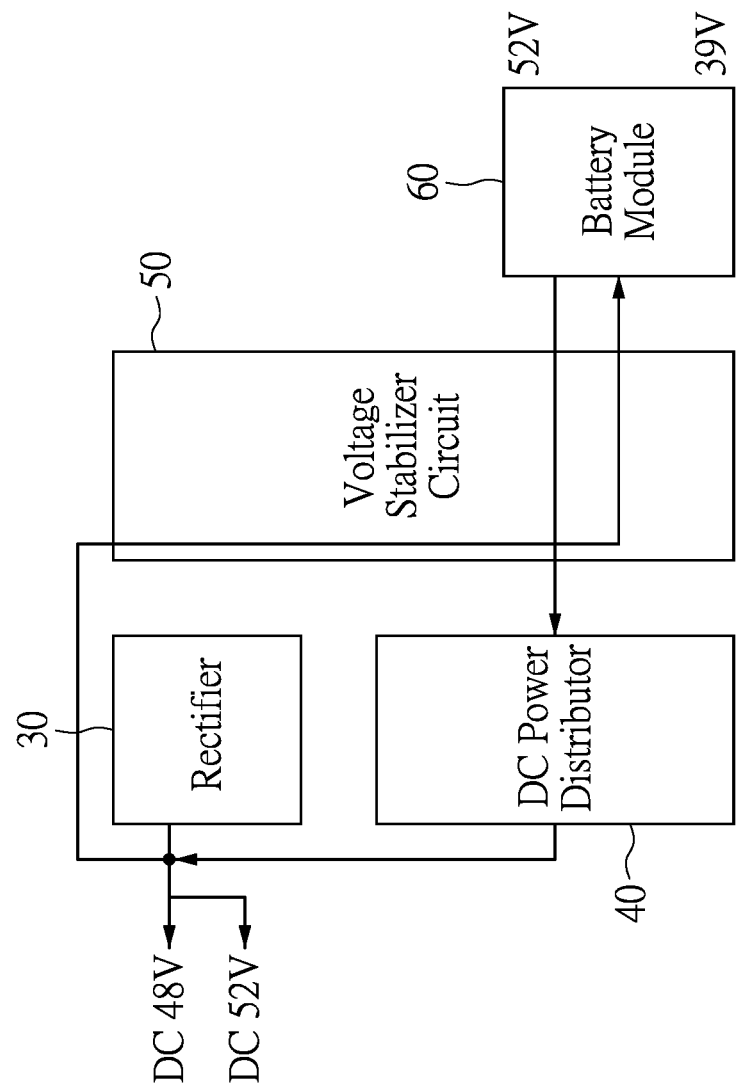
FIG. 3 is a block diagram of a voltage stabilizing system of the switching direct current power supply equipment that adjusts power from a battery module and a rectifier according to the embodiment of the present disclosure.

Reference is made to FIGS. 1 to 3, in which FIG. 3 is a block diagram of a voltage stabilizing system of the switching direct current power supply equipment that adjusts power from a battery module and a rectifier according to the embodiment of the present disclosure.

In the embodiment, the switching direct current power supply equipment may include the rectifier 30, a DC power distributor 40, the voltage stabilizer circuit 50 and a battery module 60. In practice, more DC power distributors and battery modules may be arranged as shown in FIG. 2. The battery module 60 may include one or more batteries or a battery pack having the batteries.

In the embodiment, the battery module 60 has a full charge voltage of 54V and a cut off voltage of 39V. The voltage stabilizer circuit 50 may boost, buck, or buck and boost the DC power supplied by the rectifier 30 or the battery module 60 according to power requirements of the external electronic devices. Then, the DC power distributor 40 distributes the boosted or bucked DC power to one or more of the external electronic devices.

For example, when a maximum power that the rectifier 30 can supply is 48V, but 52V is required to fully charge the battery module 60, the voltage stabilizer circuit 50 boosts the DC power supplied by the rectifier 30 from 48V to 52V, and then provides the boosted DC power to the battery module 60. As a result, the battery module 60 is charged by the boosted DC power and finally reaches fully charge.

Therefore, a current supplied by the rectifier 30 of the switching direct current power supply equipment in the embodiment of the present disclosure can fully charge the battery module 60 without the battery module 60 being taken out from the machine cabinet 100 and charged by an external power supply device. Therefore, the switching direct current power supply equipment of the present disclosure is convenient for use, and costs of the external power supply device can be saved.

Figure 4:
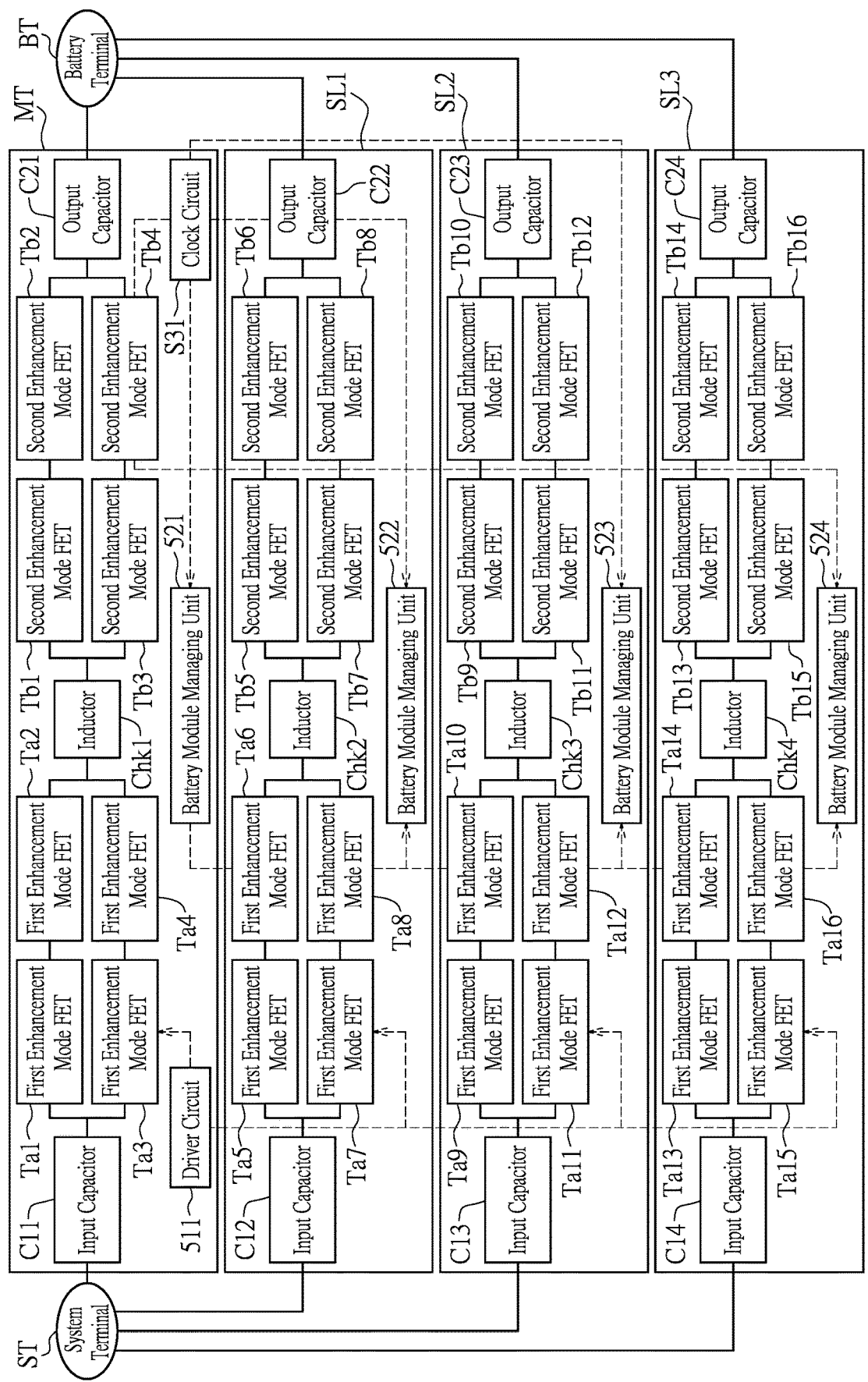
FIG. 4 is a block diagram of a main voltage stabilizer circuit and a plurality of slave voltage stabilizer circuits of the voltage stabilizing system of the switching direct current power supply equipment according to the embodiment of the present disclosure.

Reference is made to FIG. 4, which is a block diagram of a main voltage stabilizer circuit and a plurality of slave voltage stabilizer circuits of the voltage stabilizing system of the switching direct current power supply equipment according to the embodiment of the present disclosure.

In the embodiment, the switching direct current power supply equipment includes a voltage stabilizer circuit. For example, the voltage stabilizer circuit includes a main voltage stabilizer circuit MT and a plurality of slave voltage stabilizer circuits SL1 to SL3 as shown in FIG. 4.

It is worth noting that, a circuit board of the main voltage stabilizer circuit MT shown in FIG. 4 is pluggably installed in the machine cabinet 100 of the switching direct current power supply equipment as shown in FIG. 1. Optionally, the slave voltage stabilizer circuits SL1 to SL3 are pluggably installed in the machine cabinet 100. A quantity of the slave voltage stabilizer circuits may vary according to a quantity and power requirements of the external electronic device or the battery modules.

The main voltage stabilizer circuit MT may include an input capacitor C11, a plurality of first enhancement mode field effect transistors (FET) Ta1 to Ta4, an inductor Chk1, a plurality of second enhancement mode field effect transistors Tb1 to Tb4 and an output capacitor C21.

One terminal of the input capacitor C11 is connected to a system terminal ST. For example, the system terminal ST is an output terminal of the rectifier 30 shown in FIG. 2, or a node between the output terminal of the rectifier 30 and input terminals of the DC power distributors 41 to 43. The other terminal of the input capacitor C11 is connected to the first enhancement mode field effect transistors Ta1 and Ta3. The first enhancement mode field effect transistor Ta2 is connected to the first enhancement mode field effect transistor Ta1. The first enhancement mode field effect transistor Ta4 is connected to the first enhancement mode field effect transistor Ta3.

The inductor Chk1 is connected between a first enhancement mode field effect transistor group and a second enhancement mode field effect transistor group. The first enhancement mode field effect transistor group has the first enhancement mode field effect transistors Ta1 to Ta4, and the second enhancement mode field effect transistor group has the second enhancement mode field effect transistors Tb1 to Tb4. In other words, the inductor Chk1 is connected to the first enhancement mode field effect transistors Ta2, Ta4 and the second enhancement mode field effect transistors Tb1, Tb3. The second enhancement mode field effect transistor Tb1 is connected to the second enhancement mode field effect transistor Tb2. The second enhancement mode field effect transistor Tb3 is connected to the second enhancement mode field effect transistor Tb4.

One terminal of the output capacitor C21 is connected to the second enhancement mode field effect transistor Tb2 and the second enhancement mode field effect transistor Tb4. The other terminal of the output capacitor C21 is connected to a battery terminal BT. For example, the battery terminal BT may be an input terminal or an output terminal of one of the battery modules 61 to 63 shown in FIG. 2, or a node between the voltage stabilizer circuit 50 and the battery modules 61 to 63.

Similarly, the slave voltage stabilizer circuit SL1 may include an input capacitor C12, a plurality of first enhancement mode field effect transistors Ta5 to Ta8, an inductor Chk2, a plurality of second enhancement mode field effect transistors Tb5 to Tb8 and an output capacitor C22. The slave voltage stabilizer circuit SL2 may include an input capacitor C13, a plurality of first enhancement mode field effect transistors Ta9 to Ta12, an inductor Chk3, a plurality of second enhancement mode field effect transistors Tb9 to Tb12 and an output capacitor C23. The slave voltage stabilizer circuit SL3 may include an input capacitor C14, a plurality of first enhancement mode field effect transistors Ta13 to Ta16, an inductor Chk4, a plurality of second enhancement mode field effect transistors Tb13 to Tb16 and an output capacitor C24. A circuit configuration of each of the slave voltage stabilizer circuits SL1 to SL3 is similar to that of the master voltage stabilizer circuit MT as shown in FIG. 4, and the same descriptions are not repeated herein.

A difference between the master voltage stabilizer circuit MT and the slave voltage stabilizer circuits SL1 to SL3 is that, the master voltage stabilizer circuit MT further includes a driver circuit 511. The driver circuit 511 may be connected to the first enhancement mode field effect transistors Ta1 to Ta16. The driver circuit 511 optionally drives the first enhancement mode field effect transistors Ta1 to Ta16 to operate.

The master voltage stabilizer circuit MT and the slave voltage stabilizer circuits SL1 to SL3 may respectively include battery module managing units 521 to 524. The battery module managing units 521 to 524 may be connected to the battery modules 61 to 63 and the driver circuit 511. A clock circuit S31 of the master voltage stabilizer circuit MT may output a clock signal to the battery module managing units 521 to 524 at a preset time point or at intervals. When the battery module managing units 521 to 524 are triggered by the clock signal, the battery module managing units 521 to 524 monitor and provide states of the battery modules 61 to 63 to the driver circuit 511. The driver circuit 511 may control the first enhancement mode field effect transistors Ta1 to Ta16 according to the states of the battery modules 61 to 63.

Figure 5:
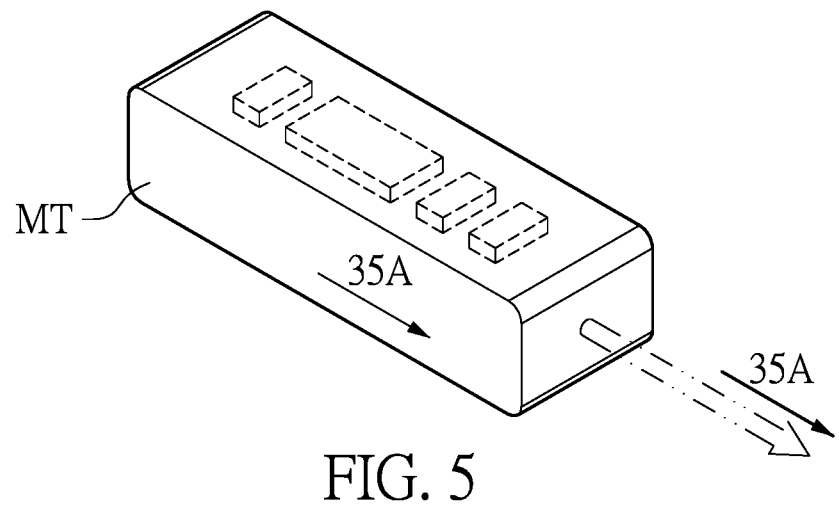
FIG. 5 is a schematic diagram of the main voltage stabilizer circuit that is used to adjust a current and disposed in the voltage stabilizing system of the switching direct current power supply equipment according to the embodiment of the present disclosure.

Reference is made to FIG. 5, which is a schematic diagram of the main voltage stabilizer circuit that is used to adjust a current and disposed in the voltage stabilizing system of the switching direct current power supply equipment according to the embodiment of the present disclosure.

As shown in FIG. 5, the voltage stabilizing system of the switching direct current power supply equipment may include only the master voltage stabilizer circuit MT. The master voltage stabilizer circuit MT shown in FIG. 5 may include circuit components that are the same as those of the master voltage stabilizer circuit MT shown in FIG. 4, but the present disclosure is not limited thereto. A circuit board of the main voltage stabilizer circuit MT is pluggably installed in the machine cabinet 100 of the switching direct current power supply equipment as shown in FIG. 1.

The master voltage stabilizer circuit MT shown in FIG. 5 may receive direct currents from the rectifier 30 shown in FIGS. 2 and 3, the battery modules 61 to 63 shown in FIG. 2 or the battery module 60 shown in FIG. 3. Then, the master voltage stabilizer circuit MT may boost or buck the received direct currents. For example, the master voltage stabilizer circuit MT outputs the direct current of 35 A. Then, the DC power distributor 40 shown in FIG. 3 or the DC power distributors 41 to 43 shown in FIG. 2 may distribute the boosted or bucked direct current to the external electronic devices, the battery module 60 shown in FIG. 3 or the battery modules 61 to 63 shown in FIG. 2.

Figure 6:
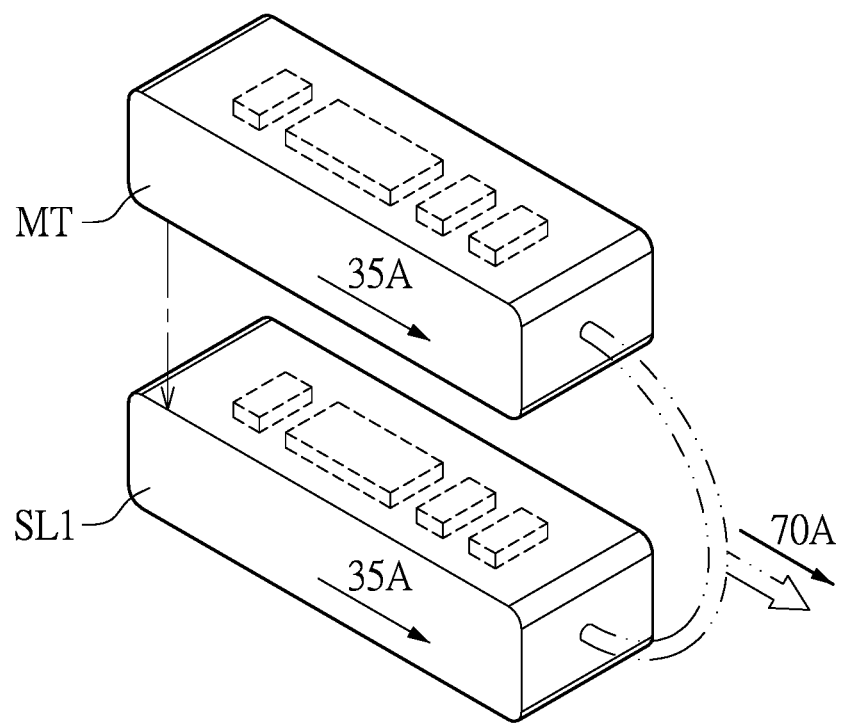
FIG. 6 is a schematic diagram of one of the slave voltage stabilizer circuits and the main voltage stabilizer circuit distributing a current in the voltage stabilizing system of the switching direct current power supply equipment according to the embodiment of the present disclosure.

Reference is made to FIG. 6, which is a block diagram of one of the slave voltage stabilizer circuits and the main voltage stabilizer circuit that is used to distribute a current in the voltage stabilizing system of the switching direct current power supply equipment according to the embodiment of the present disclosure.

The voltage stabilizing system may include only the master voltage stabilizer circuit MT as shown in FIG. 5, or include both the master voltage stabilizer circuit MT and the slave voltage stabilizer circuit SL1 as shown in FIG. 6. The slave voltage stabilizer circuit SL1 shown in FIG. 6 may be the same as the slave voltage stabilizer circuit SL1 shown in FIG. 4, but the present disclosure is not limited thereto. The same descriptions are not repeated herein.

The master voltage stabilizer circuit MT may control the slave voltage stabilizer circuit SL1, and distribute the DC power respectively to the main voltage stabilizer circuit MT and the slave voltage stabilizer circuit SL1. Then, the master voltage stabilizer circuit MT and the slave voltage stabilizer circuit SL1 perform the voltage stabilization process on the distributed DC power.

For example, the switching direct current power supply equipment of the embodiment may utilize an inductor direct current resistance (DCR) of an inductor to sense output currents during a current balancing operation. In addition, a transconductance (gm) amplifier is often used to detect the current, and eliminate an offset error in linearity of a curve of the current versus a transconductance during the current balancing operation. After the current balancing operation is performed, a current outputted by the master voltage stabilizer circuit MT is equal to a current outputted by the slave voltage stabilizer circuit SL1 shown in FIG. 5, or equal to a current outputted by each of the slave voltage stabilizer circuits SL1 to SL3 shown in FIG. 4. The slave voltage stabilizer circuits SL1 to SL3 shown in FIG. 4 output the same amount of current. However, the inductor having an inductance lower than a milliohm level is often applied in a pulse width modulation (PWM) process of signals of the currents, which causes a large difference to exist between the currents that are respectively outputted by the master voltage stabilizer circuit MT and the slave voltage stabilizer circuits SL1 to SL3. Therefore, in the embodiment, the master voltage stabilizer circuit MT is disposed in the switching direct current power supply equipment and configured to averagely distribute the currents to the slave voltage stabilizer circuits SL1 to SL3.

As shown in FIG. 6, the master voltage stabilizer circuit MT and the slave voltage stabilizer circuit SL1 are configured to output the direct currents having the same current value, such as 35A. The DC distributor 40 shown in FIG. 3 distributes or the DC distributors 41 to 43 shown in FIG. 2 distribute the direct currents to the external electronic devices, the battery module 60 shown in FIG. 3 or the battery modules 61 to 63 shown in FIG. 2. Therefore, a sum of the currents that are received by the external electronic devices, the battery module 60 or the battery modules 61 to 63 is equal to a sum of the currents that are provided by the main voltage stabilizer circuit MT and the slave voltage stabilizer circuit SL1. For example, the sum of the currents is 70 A shown in FIG. 6.

It is worth noting that, a circuit board of each of the main voltage stabilizer circuit MT and the slave voltage stabilizer circuit SL1 is pluggably installed in the machine cabinet 100 of the switching direct current power supply equipment as shown in FIG. 1. In practice, the quantity of the slave voltage stabilizer circuits plugged in the machine cabinet 100 may vary according to the quantity and the amount of power required for external electronic devices or battery modules.

Figure 7:
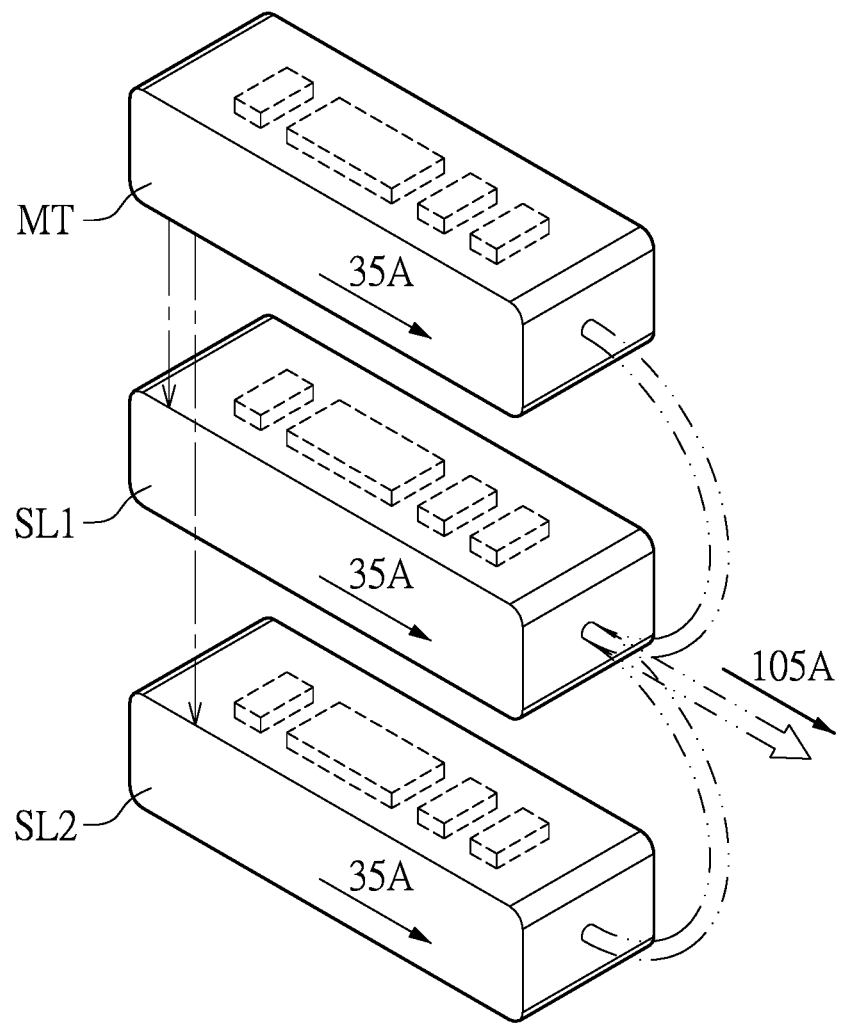
FIG. 7 is a schematic diagram of two of the slave voltage stabilizer circuits and the main voltage stabilizer circuit distributing the current in the voltage stabilizing system of the switching direct current power supply equipment according to the embodiment of the present disclosure.

Reference is made to FIG. 7, which is a schematic diagram of two of the slave voltage stabilizer circuits and the main voltage stabilizer circuit that is used to distribute the current in the voltage stabilizing system of the switching direct current power supply equipment according to the embodiment of the present disclosure.

The voltage stabilizing system of the switching direct current power supply equipment not only includes the main voltage stabilizer circuit MT as shown in FIGS. 5 and 7, but also includes the slave voltage stabilizer circuits SL1 and SL2 shown in FIG. 7. The same descriptions are not repeated herein. The slave voltage stabilizer circuits SL1 and SL2 shown in FIG. 7 may be the same as those shown in FIG. 4, but the present disclosure is not limited thereto.

The main voltage stabilizer circuit MT may control the slave voltage stabilizer circuits SL1 and SL2. The main voltage stabilizer circuit MT may distribute the DC power respectively to the main voltage stabilizer circuit MT and the slave voltage stabilizer circuits SL1 and SL2. Then, the main voltage stabilizer circuit MT and the slave voltage stabilizer circuits SL1 and SL2 perform the voltage stabilization process on the distributed DC power.

For example, as shown in FIG. 7, the main voltage stabilizer circuit MT and the slave voltage stabilizer circuits SL1 and SL2 output the direct currents having the same current value, such as 35A. The DC distributor 40 shown in FIG. 3 or the DC distributors 41 to 43 shown in FIG. 2 may distribute the direct currents from the main voltage stabilizer circuit MT and the slave voltage stabilizer circuits SL1 and SL2 to the one or more external electronic devices, the battery module 60 shown in FIG. 3 or the battery modules 61 to 63 shown in FIG. 2.

Therefore, a sum of the currents that are received by the external electronic devices, the battery module 60 or the battery modules 61 to 63 is equal to a sum of the currents that are provided by the main voltage stabilizer circuit MT and the slave voltage stabilizer circuits SL1 and SL2. For example, the sum of the currents is 105 A shown in FIG. 7.

It is worth noting that, a circuit board of each of the main voltage stabilizer circuit MT and the slave voltage stabilizer circuits SL1 and SL2 is pluggably installed in the machine cabinet 100 of the switching direct current power supply equipment as shown FIG. 1. In practice, the quantity of the slave voltage stabilizer circuits that are pluggably installed in the machine cabinet 100 may be adjusted according to the quantity and power requirements of external electronic devices or battery modules, or other requirements.

In summary, the present disclosure provides the voltage stabilizing system of the switching direct current power supply equipment, which has the following advantages:

1. the battery module does not need to replaced, but the circuit boards of the voltage stabilizer circuits may be replaced, increased or reduced such that the switching direct current power supply equipment can provide different output voltage and current to meet different power requirements;
2. the rectifier in the switching direct current power supply equipment can supply the current to charge the battery module such that the voltage of the battery reach any target voltage without taking the battery module out of the machine cabinet and charging the battery module by the external power supply device; and
3. the switching direct current power supply equipment has a bidirectional full-duplexing circuit that is used to boost, buck, or boost and buck the DC power from the battery modules and by the rectifier.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A voltage stabilizing system of a switching direct current (DC) power supply equipment, wherein the switching direct current power supply equipment includes an alternating current (AC) power distributor, a rectifier, a direct current power distributor and a battery module, the rectifier converts AC power distributed by the AC power distributor into DC power, and when the rectifier does not supply power or supplies insufficient power, the battery module is discharged and outputs the DC power, the voltage stabilizing system comprising:

a voltage stabilizer circuit connected to the rectifier, wherein the voltage stabilizer circuit is configured to perform a voltage stabilization process on the DC power from the battery module and the rectifier to boost, buck, or boost and buck the DC power, and then distribute the DC power to a plurality of external electronic devices and the battery module to fully charge the external electronic devices and the battery module during a bidirectional operation of charging and discharging;

wherein the voltage stabilizer circuit includes a main voltage stabilizer circuit and one or more slave voltage stabilizer circuits, and the main voltage stabilizer circuit is connected to the one or more slave voltage stabilizer circuits; wherein the main voltage stabilizer circuit is configured to control the one or more slave voltage stabilizer circuits, and distribute the DC power respectively to the main voltage stabilizer circuit and the slave voltage stabilizer circuits before the main voltage stabilizer circuit and the slave voltage stabilizer circuits perform the voltage stabilization process on the DC power;

wherein a circuit board of each of the main voltage stabilizer circuit and the slave voltage stabilizer circuits is pluggably installed in a machine cabinet of the switching direct current power supply equipment.

2. The voltage stabilizing system according to claim 1, wherein each of the main voltage stabilizer circuit and the slave voltage stabilizer circuits includes a boost converter circuit, a buck converter circuit, a buck-boost converter circuit or any combination thereof.

3. The voltage stabilizing system according to claim 1, wherein, after the DC power is distributed, the main voltage stabilizer circuit and the slave voltage stabilizer circuits perform the voltage stabilization process on the DC power to output a same amount of DC power.

4. The voltage stabilizing system according to claim 1, wherein a sum of currents that are received by the external electronic devices or the battery module is equal to a sum of currents that are provided by the main voltage stabilizer circuit and the slave voltage stabilizer circuits.

5. The voltage stabilizing system according to claim 1, wherein the battery module includes one or more batteries or a battery pack having the batteries.

6. The voltage stabilizing system according to claim 1, wherein, in a normal power supplying mode, the voltage stabilizer circuit performs the voltage stabilization process on the DC power that is converted by the rectifier, and then distributes the DC power to the external electronic devices through the DC power distributor;
  wherein, in a battery assisting supply mode, the voltage stabilizer circuit performs the voltage stabilization process on the DC power outputted by the battery module being discharged, and then the DC power is distributed to the external electronic devices by the DC power distributor;
  wherein, in a battery charging mode, the voltage stabilizer circuit performs the voltage stabilization process on the DC power that is converted by the rectifier, and then provides the DC power to the battery module, such that the battery module is charged by the DC power.

7. The voltage stabilizing system according to claim 1, wherein each of the main voltage stabilizer circuit and the slave voltage stabilizer circuits includes an input capacitor, a plurality of first enhancement mode field effect transistors (FET), an inductor, a plurality of second enhancement mode field effect transistors and an output capacitor;
  wherein the input capacitor is connected between the rectifier and the first enhancement mode field effect transistors, the inductor is connected between the first enhancement mode field effect transistors and the second enhancement mode field effect transistors, and the output capacitor is connected between the second enhancement mode field effect transistors and the battery module;
  wherein the main voltage stabilizer circuit further includes a driver circuit connected to the first enhancement mode field effect transistors and configured to drive the first enhancement mode field effect transistors.

8. The voltage stabilizing system according to claim 7, wherein each or any one of the main voltage stabilizer circuit and the slave voltage stabilizer circuits further includes a battery module managing unit connected to the battery module and the driver circuit, and the battery module managing unit is configured to monitor the battery module and provide a state of the battery module to the driver circuit.

* * * * *